(12) United States Patent
Pierce et al.

(10) Patent No.: US 7,643,260 B2
(45) Date of Patent: Jan. 5, 2010

(54) SYSTEM FOR EMI FILTER SURGE VOLTAGE CLAMPING

(75) Inventors: Jason Pierce, Dahlonega, GA (US); Brent Hughes, Cumming, GA (US)

(73) Assignee: ARRIS Group, Inc., Suwanee, GA (US)

( * ) Notice: Subject to any disclaimer, the term of this patent is extended or adjusted under 35 U.S.C. 154(b) by 0 days.

(21) Appl. No.: 11/546,450

(22) Filed: Oct. 11, 2006

(65) Prior Publication Data
US 2007/0081289 A1    Apr. 12, 2007

Related U.S. Application Data

(60) Provisional application No. 60/725,525, filed on Oct. 11, 2005.

(51) Int. Cl.
H02H 3/20 (2006.01)
H02H 3/22 (2006.01)

(52) U.S. Cl. .................. 361/56; 361/111; 361/91.1

(58) Field of Classification Search .................. 361/56, 361/111, 91.1
See application file for complete search history.

(56) References Cited

U.S. PATENT DOCUMENTS 3,549,947 A * 12/1970 Aitken et al. ............ 318/681
5,136,455 A * 8/1992 Billingsley .............. 361/56
5,249,186 A * 9/1993 Remson ................. 714/809
6,144,735 A * 11/2000 Bella ..................... 379/399.01
6,278,769 B1 * 8/2001 Bella ..................... 379/29.11
6,618,482 B2 * 9/2003 Parrott ................... 379/412
6,794,827 B2 * 9/2004 Nerone et al. ........... 315/224
6,895,089 B2 * 5/2005 Wang .................... 379/387.01

FOREIGN PATENT DOCUMENTS

JP    05161258 A * 6/1993

* cited by examiner

*Primary Examiner*—Stephen W Jackson
*Assistant Examiner*—Zeev Kitov
(74) *Attorney, Agent, or Firm*—Troy A. Van Aacken; Robert J. Starr

(57) ABSTRACT

A pair of back-to-back-coupled zener diodes is coupled from the input to the output of each leg of a common mode choke used in a LC circuit for reducing EMI into the power supply of an electrical device. The reversed biased zener diode of each pair breaks down when ringing voltage amplitude resulting from a voltage surge applied at the inputs of the common mode choke exceeds the breakdown threshold voltage of the zener diode. Transorb devices may be substituted for the back-to-back-coupled diode pairs.

7 Claims, 4 Drawing Sheets

SYSTEM FOR EMI FILTER SURGE VOLTAGE CLAMPING

CROSS REFERENCE TO RELATED APPLICATION

This application priority under 35 U.S.C. 119(e) to Pierce, U.S. provisional patent application No. 60/725,525 entitled "EMI filter clamping for improved surge performance," which was filed Oct. 11, 2005, and is incorporated herein by reference in its entirety.

FIELD OF THE INVENTION

The present invention relates generally to switching power supplies, and more particularly to a system for EMI filter clamping to improve surge immunity.

BACKGROUND

Switching power supplies have been used for several decades to improve system efficiency and reduce size and weight. In particular, AC/DC converters which take in AC utility power and output isolated low (typically) voltage DC for use by system circuits are largely replacing their linear counterparts. The traditional linear supplies are composed of a transformer which operates at the AC line frequency, and output rectifier/filter circuit, and a linear regulator to maintain a consistent output voltage. Switching AC/DC converters rectify and filter the incoming AC line to create a high-voltage DC bus. A chopper circuit drives a high frequency transformer with pulses of this DC bus at frequencies typically in the 10's or 100's of kilohertz.

The unfortunate side affect of the switching action is the creation of electromagnetic interference (EMI). EMI can be both radiated and conducted (out the power cord for example) and can interfere with other nearby electronics. For this reason, various government and pseudo-government agencies around the world specify limitations on the allowable amount of EMI. To address the conducted EMI, power supply designers typically add an L-C (inductor-capacitor) EMI filter to the AC line interface. The filter is typically designed to reduce both differential mode (Line-Line) and common mode (Line-Ground) noise.

For AC/DC converters as well as other electronics, surges from lightning and AC power grid operations are a field hazard. Vast numbers of electronics are destroyed every year from surges. As with EMI, various government and pseudo-government agencies around the world specify minimum surge immunity levels which depend on the type of product and installation practices for that product. Both common mode and differential mode surge requirements are typically specified. Compliance is normally verified by testing with a surge generator that simulates lightning induced surges. Various surge waveforms are used for different applications. For AC line surges, a waveform with a 1.2 us rise time and an exponential decay with a 50 us half power decay time (1.2×50 us) is typically used.

Many electronic products are now double insulated and use only a two wire AC power cord. As such, common mode surge requirements are not applicable for many of these devices as there is no ground connection. However, certain devices such as a cable modem, an embedded multimedia terminal adapter ("eMTA"), a cable set-top box, a television, etc are affected. These devices get connected to ground through the coax cable connection. This becomes a further liability for these devices because the coax ground often has a less than optimal connection to the power ground of the installation. This can lead to elevated surge levels than would otherwise be experienced. As a result, these types of devices are often damaged from common mode surges. To cope with this, many cable operators specify surge immunity requirements in excess of the standards. For example, the standard for an eMTA is 2 kV (1.2×50 us waveform) common mode, but some cable operators require up to 10 kV.

As shown in FIG. 1, power supply 2 uses a common mode choke 4 together with a common mode capacitor 6 that spans the boundary between the primary and the secondary sections of the power supply. Inductor 4 and capacitor 6 operate as a filter to filter EMI from the switching action of the power supply, thus preventing the EMI energy from emanating onto the AC power network from power supply 2.

These components, including the common mode choke 4 and common mode capacitor 6 are typically capable of withstanding voltages of 2 KV, and even 10 KV without being damaged. However, when a voltage surge is applied to the inputs of power supply 2, an oscillation, or resonant ringing, often occurs in the L-C circuit formed by common mode choke 4 and common mode capacitor 6. This causes the instantaneous voltage stress to be greater than the peak of the actual applied surge voltage.

A surge test signal applied by surge generator 7 to the inputs of a power supply 2 as shown in FIG. 1 is shown by trace 8 in FIG. 2. The resulting resonant ringing across the common mode capacitor 6 is shown by trace 10. In practice, non-linearities such as common mode choke saturation would typically limit, but not eliminate this ringing. It is noted that some of the oscillation caused by ringing, as shown by peaks 12 and 14 in FIG. 2 exceed the input signal, some by a factor of 1.5 or more. This high amplitude resonant ringing is impressed upon every component that spans the isolation boundary between the primary and secondary side of the power supply (i.e., common mode capacitor 6, transformer 15 and the feedback circuit). Although the common mode capacitor 6 and transformer 15 shown in FIG. 1 may be capable of sustaining 10 KV energy levels, first oscillation peak 12 shown in FIG. 2 may exceed the surge voltage that these components are able to withstand. As discussed above, a surge signal represented by trace 8 may be impressed during testing by a common mode surge generator, or the surge/spike may be impressed by a nearby lightning strike when a device is deployed in the field.

In a device that is designed for use in an electrical system where ground 16 is connected to a reliable earth ground with either a three wire cord or a dedicated ground wire, one or more Metal Oxide Varistors ("MOV") may be used across the line and neutral inputs, across the line input and ground 16 and across neutral and ground 16.

However, some providers require that a device be operable even when a reliable ground 16 is not available. This may be because the local electrical distribution system does not provide a reliable ground, because the building where the device is to be used does not provide a reliable ground, or because the building where the device is to be used does not provide three-prong electrical receptacles. In such scenarios, the MOVs would not provide adequate protection because 'ground' node 16 could float, thus not providing an low potential 'destination' for charge that would otherwise be shunted by the MOVs around common mode capacitor 6. Furthermore, safety regulations typically do not allow the connection of surge dissipative devices such as MOVs to a 'functional ground' such as the coax cable shield.

Thus, there is a need in the art for a system for protecting power supply circuitry in an electrical device from high voltage surges when a reliable earth ground is not available for the device's circuitry.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
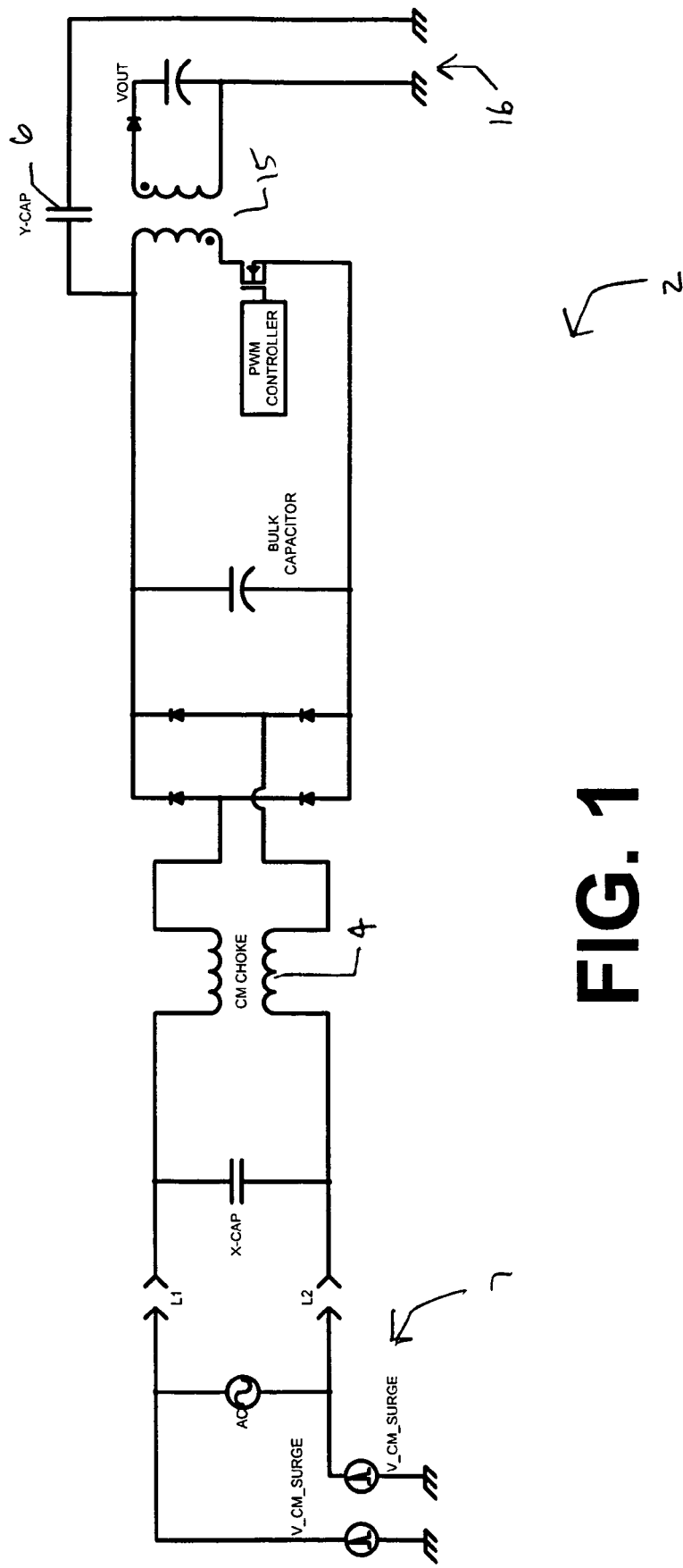
FIG. 1 illustrates a power supply system 2 that uses EMI filtering circuitry.
Figure 2:
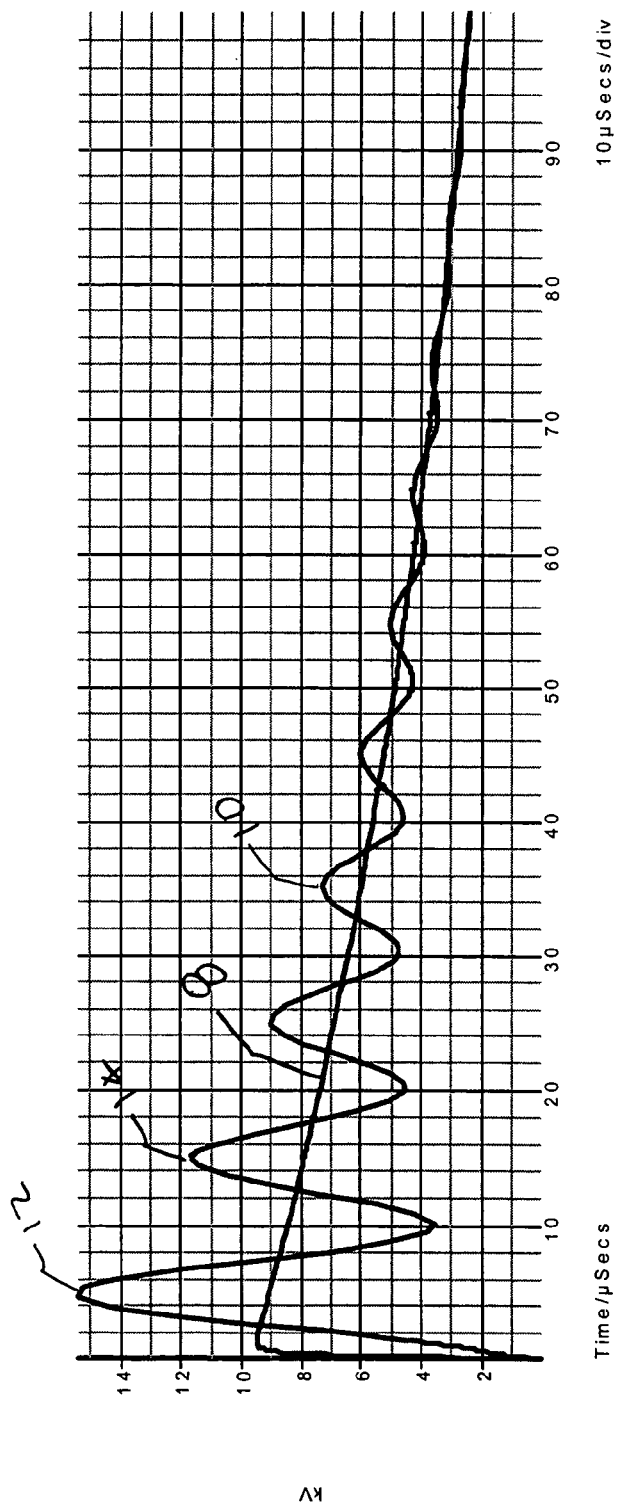
FIG. 2 illustrates a plot of traces of a high voltage surge and the resultant ringing across the common mode capacitor caused by the underdamped response of the EMI filter.
Figure 3:
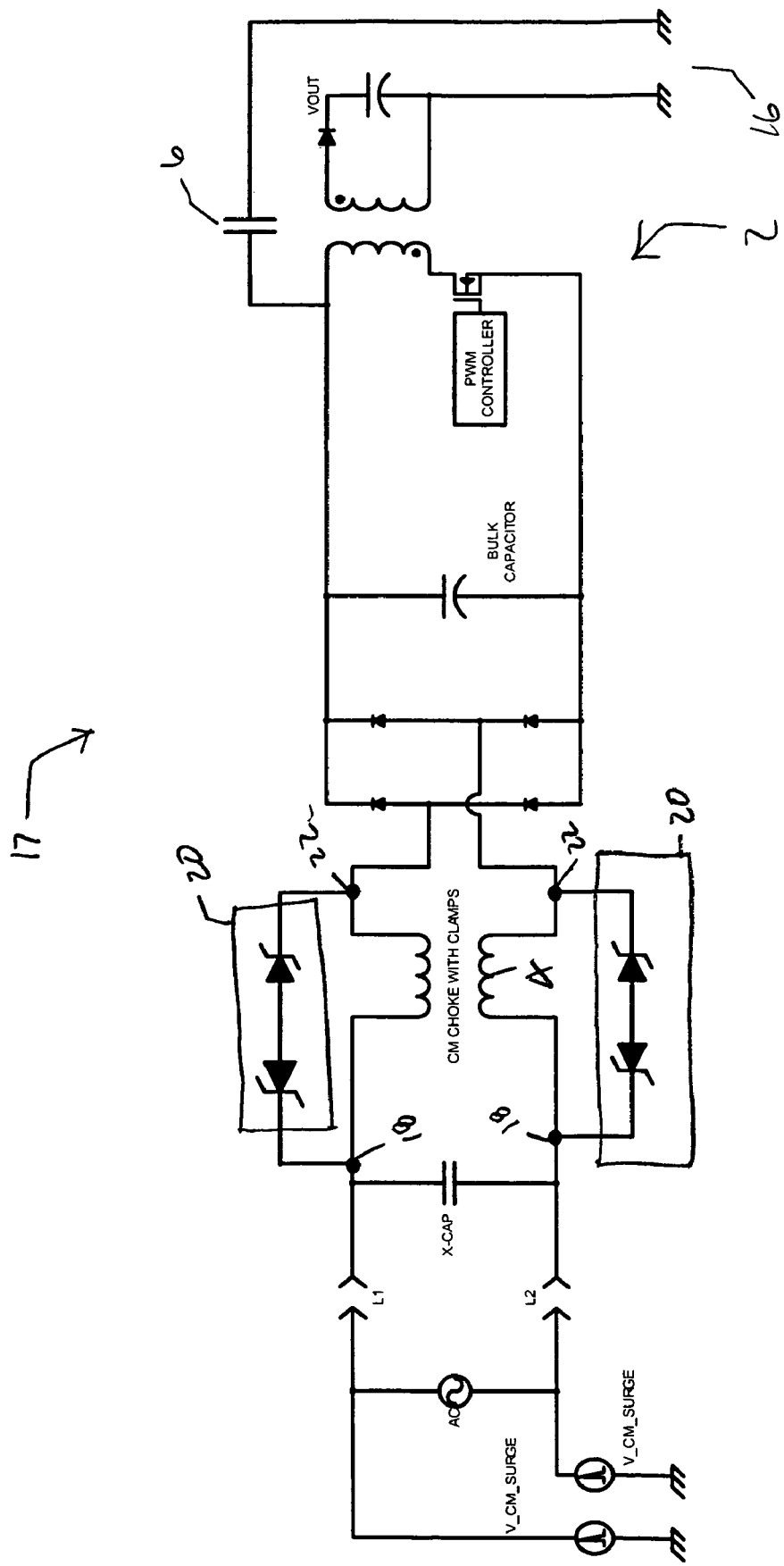
FIG. 3 illustrates back-to-back zener diodes that clamp both sides of a common mode choke.
Figure 4:
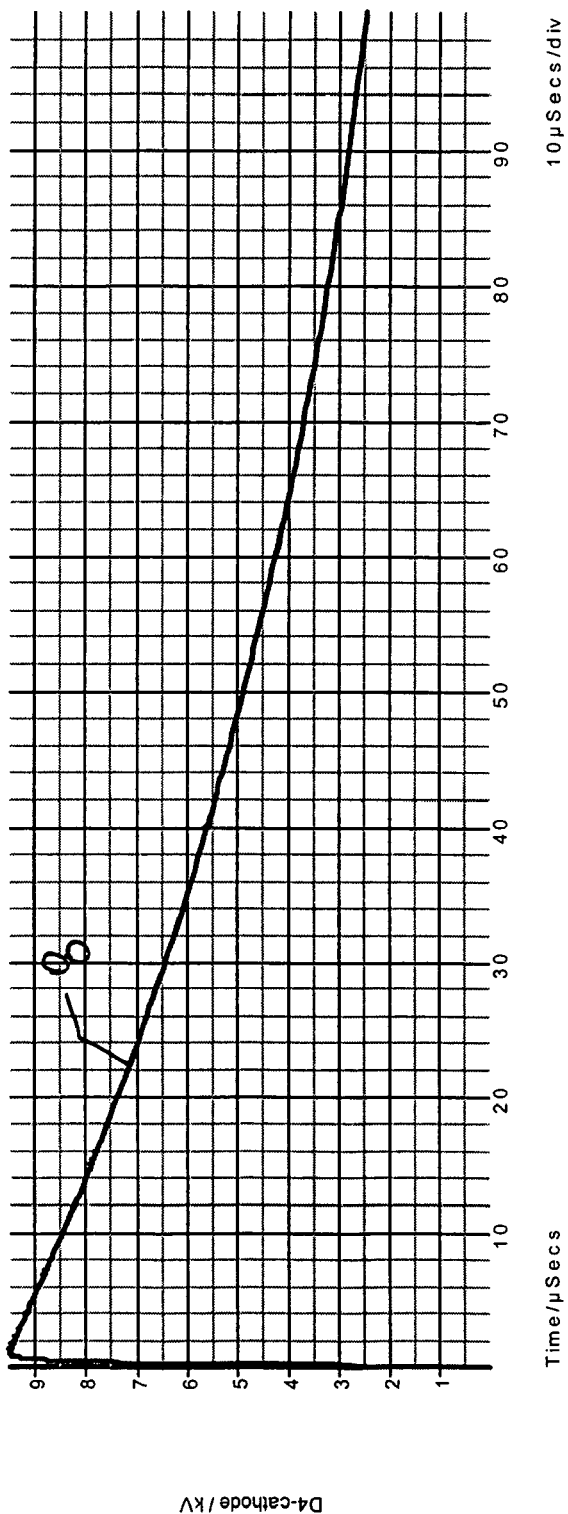
FIG. 4 illustrates a plot of the voltage across the common mode capacitor during the surge with the circuit modifications of FIG. 3 implemented.

Turning now to FIG. 3 a system 17 is shown for protecting EMI filter components from high voltage common modem surges applied at inputs 18 to power supply circuit 2. A back-to-back avalanche device 20, for example two zener diodes connected to one another at their respective anodes, are connected to common mode choke 4 to clamp resonant ringing voltages resulting from the surge voltage that is applied to common mode inputs 18. Each back-to-back diode pair 20 is connected from a common mode input 18 to a corresponding common mode choke output 22. Thus, for example, when voltage amplitude extremes 12 and 14 caused by ringing shown in FIG. 2 occur, the reversed biased diode of each back-to-back diode pair 20 breaks down. This, breaking down of the reverse biased diode during extreme voltage amplitude clamps the voltage from the corresponding input to the corresponding output of the corresponding leg of common mode choke 4. Accordingly, the voltage from an input 18 to an output 22 of common mode choke 4 is clamped at approximately the breakdown voltage of the reverse-biased zener diode. When voltage across common mode choke 4 is so clamped, common mode capacitor 6 and common mode choke 4 no longer operate as an LC circuit because the common mode choke is effectively removed from the LC circuit. Since common mode choke 4 is effectively removed from what in conjunction with common mode capacitor 6 would otherwise be an LC circuit, resonant ringing is reduced almost to the point of elimination as shown in FIG. 4. FIG. 4 shows voltage across the common mode capacitor 6 when surge voltage signal 8 applied as in FIG. 2, but there is no ringing trace apparent in FIG. 4. Thus, the maximum voltage reaching common mode capacitor 6 shown in FIG. 3 is held to approximately whatever the applied surge voltage is, thus protecting the common mode capacitor from damage. In reference to the schematic symbol for a zener diode used in FIGS. 1 and 3, the base of the triangle perpendicular to the current flow path is referred to as the anode and the opposite end is the cathode. It will be appreciated that for each back-to back avalanche pair, the individual devices, i.e., zener diodes, for example, may also be coupled together at the cathode of each component device. Thus, the anode of each back-to-back pair would be coupled between the input 18 and output 22 of a corresponding leg of the common mode choke 4. As discussed above, zener diodes may be used to form each of the back-to-back avalanche devices 20. In addition, devices known as Transient Voltage Suppressor devices, or transorb devices, may also be used. An example of a transorb device that may be used is a device sold by Philips having part number PESD5VOS1BA.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A system for protecting components of a EMI suppression circuit having a common mode capacitor and a common mode choke from common mode surge voltage ringing, wherein the common mode choke includes a first inductor and a second inductor, comprising:
    a first back-to-back avalanche device pair coupled in parallel with the first inductor of the common mode choke, and a second back-to-back avalanche device pair coupled in parallel with the second inductor of the common mode choke.

2. The system of claim 1 wherein the back-to-back avalanche device pair includes two zener diodes coupled to one another at the anode of each zener diode.

3. The system of claim 2 wherein one of the cathodes of the back-to-back avalanche device is coupled to an input of the common mode choke and the other cathode of the back to back device is coupled to a corresponding output of the common mode choke.

4. The system of claim 1 wherein the back-to-back avalanche device is a transorb.

5. The system of claim 1 wherein the back-to-back avalanche device pair includes two zener diodes coupled to one another at the cathode of each zener diode.

6. The system of claim 5 wherein one of the anodes of the back-to-back avalanche device is coupled to an input of the common mode choke and the other anode of the back to back device is coupled to a corresponding output of the common mode choke.

7. The system of claim 1 wherein the back-to-back avalanche device is a transorb.

* * * * *